(12) United States Patent
Togo et al.

(10) Patent No.: US 6,585,594 B2
(45) Date of Patent: Jul. 1, 2003

(54) STORAGE MEDIUM STORING DISPLAY CONTROL PROGRAM, ENTERTAINMENT APPARATUS, AND DISPLAY CONTROL PROGRAM

(75) Inventors: Mitsuhiro Togo, Tokyo (JP); Kazuhito Miyaki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/860,252

(22) Filed: May 18, 2001

(65) Prior Publication Data

US 2002/0077181 A1 Jun. 20, 2002

(30) Foreign Application Priority Data

May 19, 2000 (JP) .................................... 2000-147520
Mar. 22, 2001 (JP) .................................... 2001-081857

(51) Int. Cl.[7] .............................. A63F 13/00; G06T 3/40
(52) U.S. Cl. ........................ 463/31; 345/647; 345/667
(58) Field of Search ..................... 463/31–33; 345/647, 345/667, 668

(56) References Cited

U.S. PATENT DOCUMENTS

| 4,893,258 A | * | 1/1990 | Sakuragi | 345/668 |
|---|---|---|---|---|
| 5,437,008 A | | 7/1995 | Gay et al. | 707/502 |
| 5,779,548 A | * | 7/1998 | Asai et al. | 463/31 |
| 2002/0075275 A1 | | 6/2002 | Togo et al. | 345/582 |
| 2002/0082078 A1 | | 6/2002 | Togo et al. | 463/30 |

OTHER PUBLICATIONS

U.S. patent application Ser. No. 09/860,250, Togo et al., filed May 18, 2001.
U.S. patent application Ser. No. 09/860,244, Togo et al., filed May 18, 2001.
"Introducing Microsoft Windows 95"; Microsoft Corporation, USA; 1995; pp. 7, 22, 72–73.

* cited by examiner

Primary Examiner—Andrew M. Dolinar
(74) Attorney, Agent, or Firm—Fitch, Even, Tabin & Flannery

(57) ABSTRACT

Displaying of display data generated by an application onto a display device can immediately be customized. A display control section 803 treats game field data passed from a game processing section 802 as texture data, and deforms the data in accordance with a registered value on a management TB 804 and a player's instruction input via a manipulation receiving section 801. Then, the display control section 803 outputs the data onto a display device. When the player's instruction is not input, the data is deformed on the basis of only the registered value on the management TB 804 and the date is output onto the display device.

8 Claims, 15 Drawing Sheets

MANAGEMENT TABLE 804

|  | DEFAULT | | | CURRENT | | |
|---|---|---|---|---|---|---|
|  | GAME | CAPTION | SELECTION | GAME | CAPTION | SELECTION |
| COORDINATE VALUES | (x,y) | (x,y) | (x,y) | (x,y) | (x,y) | (x,y) |
| MAGNIFICATION | 1 | 1 | 1 | 1 | 1.5 | 1 |
| PERSPECTIVE | 0° | 0° | 0° | -30° | 0 | 0 |

STORAGE MEDIUM STORING DISPLAY CONTROL PROGRAM, ENTERTAINMENT APPARATUS, AND DISPLAY CONTROL PROGRAM

This application claims a priority based on Japanese Patent Application Nos. 2000-147520 and 2001-081857 filed on May 19, 2000 and Mar. 22, 2001 respectively, the entire contents of which are incorporated herein by reference for all purposes.

BACKGROUND OF THE INVENTION

The present invention relates to a technology for controlling displaying of display data onto a display device, which is generated by an application program running on a computer, particularly by a game program.

In recent years, entertainment apparatuses such as TV game machines have been popularized. In the entertainment apparatus, one can enjoy variety of games by executing game programs obtained via a storage medium such as a CD-ROM and a DVD-ROM or via a communication medium such as a communication line and a network. For example, in the game program called an RPG (role playing game), an AVG (adventure game), an SLG (simulation game) and the like, a story is progressed in response to an instruction from a player, which is sent via a controller connected to the entertainment apparatus. In making progress, the contents of the story to be thereafter developed are changed in response to the instruction contents of the player. With these kinds of games, the player can enjoy various developments of the story in response to the instruction contents performed by himself/herself.

Generally, in such kinds of games, a game field for displaying an image (game image) that shows a story progressing in response to the player's instruction contents, a selection field for allowing the player to select a story development via the controller, and a caption field for displaying narration regarding the image on the game field if needed are displayed on a display screen of the display device. Relative positions and sizes of these kinds of fields on the display screen of the display device have heretofore been fixed.

SUMMARY OF THE INVENTION

Incidentally, in a game of this kind, there are cases where a secret is displayed on a portion of the game field. Here, a secret is a clue to a future development for a player to precede the story. In such a case, the player may desire to have that portion more easily to see. However, as described above, since display position and display size of the game field on a display screen have been heretofore fixed, that portion may be hidden by the selection field or the caption field displayed so as to overlap the game field. In this case, the player had to progress the story until that portion moves to an area on the game field, which is not hidden by the selection field or the caption field. In other words, there were situations where the player could not confirm a necessary portion of the game field in the case of necessity in the course of the story.

The present invention has been created in consideration for the above-described circumstances. The object of the present invention is to enable a manipulator to immediately customize displaying of display data onto a display device when needed, the display data being generated by an application program, particularly a game program, which is running on a computer such as an entertainment apparatus.

In order to achieve the above-described object, the entertainment apparatus of the present invention controls displaying of a display data, which is generated by the application program such as a game program, onto the display device in response to the manipulator's instruction received via the controller connected to the entertainment apparatus.

Specifically, the entertainment apparatus is provided with first means for receiving an assignment of a deformation ratio of an image represented by the display data via the controller from the manipulator, and second means for processing the display data in accordance with the deformation ratio assigned by the first means and for displaying the display data onto the display screen of the display device.

Here, as the deformation ratio of the image represented by the display data, the ratio received by the first means from the manipulator, for example, a ratio of the lengths of the right/left sides and a magnification of the lengths of the upper/lower sides of the image, or a ratio of the lengths of the upper/lower sides and a magnification of the lengths of the right/left sides of the image are enumerated. Moreover, in the second means, the display data is treated as texture data and may be processed in accordance with the deformation ratio specified by the first means and output onto the display device.

DETAILED DESCRIPTION OF THE PREFERRED EMBODIMENTS

Hereinbelow, one embodiment of the present invention will be described.

First, a hardware structure of an entertainment apparatus according to the embodiment of the present invention will be described.

Figure 1:
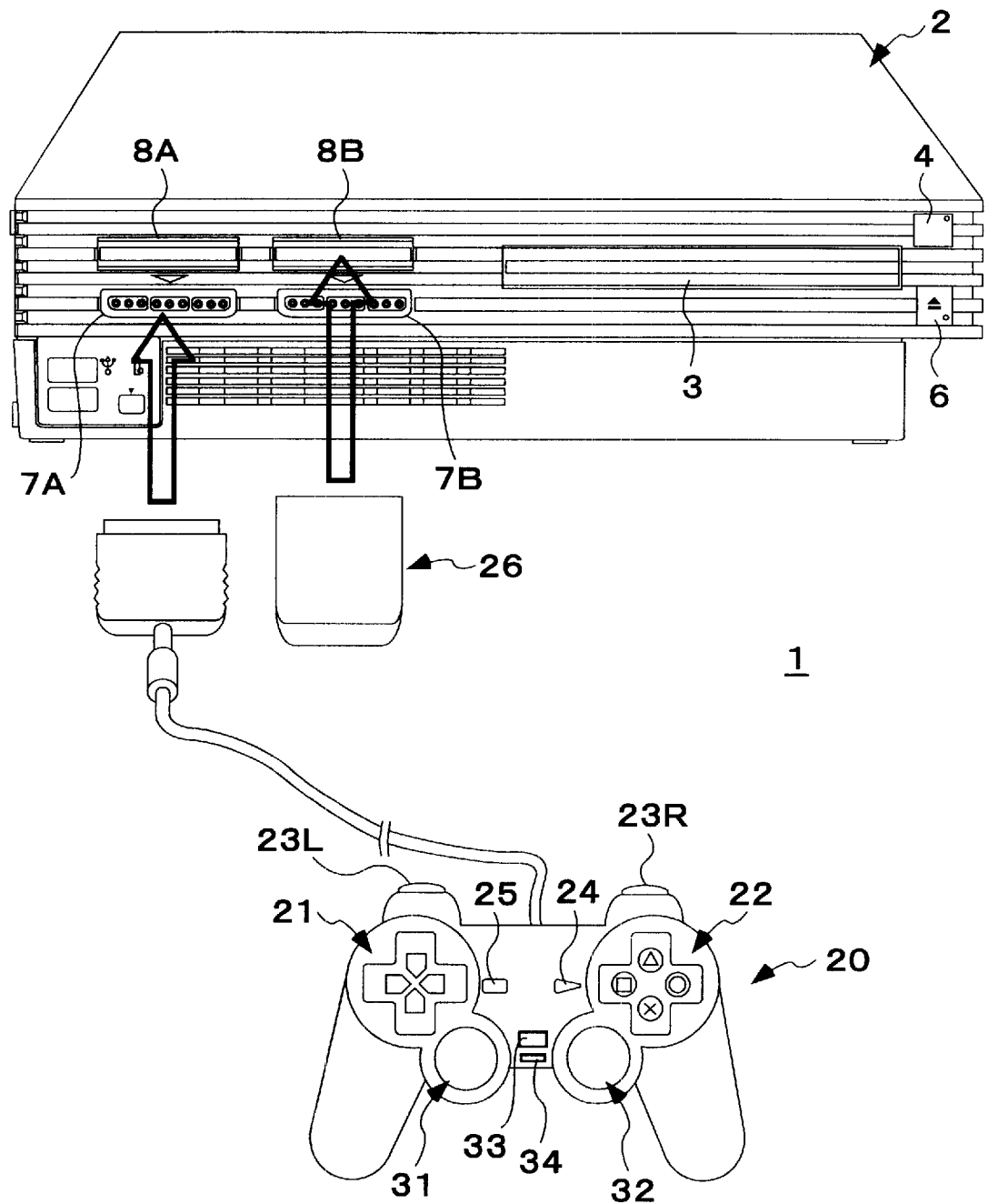
FIG. 1 is an external view showing examples of an entertainment apparatus 1 and a controller 20, to which one embodiment of the present invention is applied.

FIG. 1 shows an external view of the entertainment apparatus according to the embodiment of the present invention.

An entertainment apparatus 1 of the embodiment is, for example, the one that reads a game program stored in an optical disk or the like such as a CD-ROM and a DVD-ROM and executes a game according to an instruction from a player. Here, execution of the game is referred to as controlling images (game images) in a game field displayed on a display screen of a display device (CRT, LCD, projection device or the like) and sounds (game sounds) from an audio device, which are connected to the entertainment apparatus 1, and as progressing the game, mainly by instruction from a player.

As shown in the figure, a body 2 of the entertainment apparatus 1 comprises: a tray type disk inserting portion 3 where the optical disk such as a CD-ROM and a DVD-ROM is inserted, which is a storage medium for supplying an application program such as a TV game and multimedia data; a reset button 4 for resetting a game; a tray control button 6 for controlling insertion/ejection of a tray of the optical disk inserting portion 3; controller connection portions 7A and 7B; and memory card inserting portions 8A and 8B. Moreover, on the back of the body 2, provided are a power switch, AV terminals (not shown) for connecting the entertainment apparatus 1 to the display device and the audio device and the like.

Two controllers 20 can be connected to the controller connection portions 7A and 7B, and two players can play various games. In addition, a memory card 26 for saving (storing) and reading game data can be inserted in the memory card inserting portions 8A and 8B.

The controller 20 includes first and second manipulation portions 21 and 22, an L button 23L, an R button 23R, a start button 24 and a selection button 25. The controller 20 further includes: analog manipulation portions 31 and 32 capable of analog control; a mode selection switch 33 for selecting a control mode of the manipulation portions 31 and 32; and a display portion 34 for displaying the selected control mode.

Figure 2:
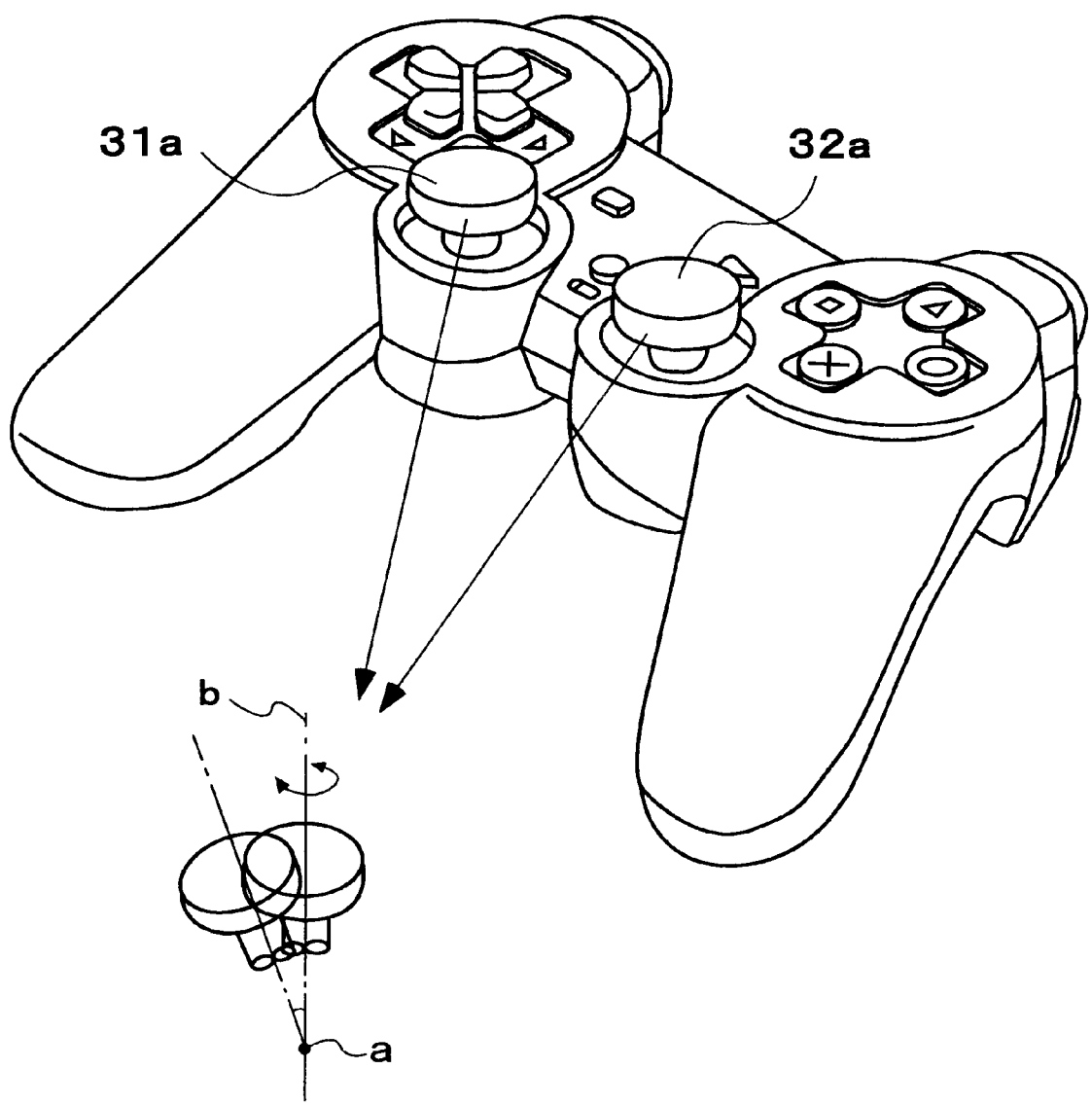
FIG. 2 is a view showing the controller 20 shown in FIG. 1.

The analog manipulation portions 31 and 32, as shown in FIG. 2, include manipulation sticks 31a and 32a, each of which is constituted so as to be tiltable and rotatable with a specified fulcrum "a" on a specified axis "b" as a pivot. The controller 20 detects a tilt of the manipulation sticks 31a and 32a against to the axis "b" and its tilt direction, and outputs a signal according to a coordinate value on XY coordinates determined by the tilt and the direction.

Figure 3:
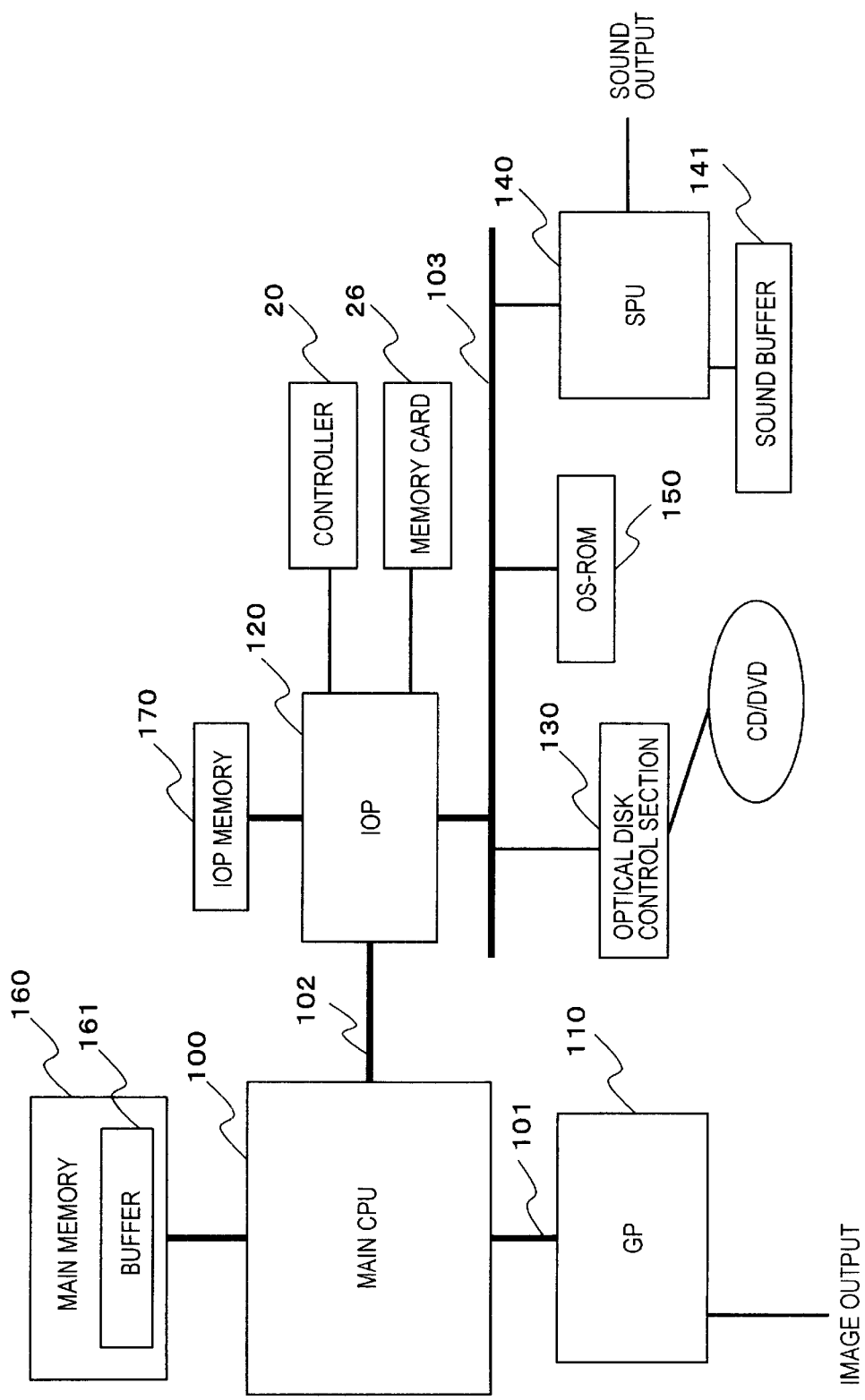
FIG. 3 is a view showing a hardware structure of the entertainment apparatus 1 shown in FIG. 1.

Next, a constitution of the entertainment apparatus 1 is shown in FIG. 3.

As shown in the figure, the entertainment apparatus 1 of the present invention includes: a main CPU 100; a graphic processor (GP) 110; an I/O processor (IOP) 120; an optical disk control section 130 for controlling the optical disk such as a CD-ROM, a DVD-ROM or the like in which the application program and the multimedia data are stored; a sound reproduction processing unit (SPU) 140; a sound buffer 141; an OS-ROM 150 storing an operating system program executed by the main CPU 100 and the IPO 120; a main memory 160 functioning as a work area of the main CPU 100 and as a buffer 161 that temporarily stores data read from the optical disk; an IOP memory 170 functioning as a work area of the IOP 120; and buses 101, 102 and 103 connecting the above-described sections.

The main CPU 100 controls the entire entertainment apparatus 1 by executing the operating system program stored in the OS-ROM 150. The IOP 120 controls input/output of signals from the controller 20 where the instruction from the player is received and input/output of data from the memory card 26 that stores settings and the like of the game.

The GP 110 draws according to a drawing instruction from the main CPU 100, and stores a drawn image into a frame buffer (not shown). Additionally, the GP 110 includes a function as a geometry transfer engine for processing a coordinate transformation etc. The geometry transfer engine constitutes, for example, a virtual three-dimensional object by a set of triangular polygons when the application programs stored in the optical disks such as the game utilize so-called 3D graphics. Then, the geometry transfer engine performs various calculations for generating an image obtained by photographing the three-dimensional object with a virtual camera. Specifically, the various calculations include a perspective transformation (a calculation of the coordinate value of vertexes of the polygons constituting the three-dimensional object when the three-dimensional object are projected onto a virtual camera screen), which is adopted in performing rendering. The GP 110, according to the drawing instruction from the main CPU 100, performs rendering of the three-dimensional object for the frame buffer to form an image by utilizing the geometry transfer engine when necessary. Then, GP 110 outputs a video signal for displaying the formed image.

The SPU 140 comprises: an ADPCM decoding function for reproducing voice data that undergoes adaptive predictive coding; a reproduction function for reproducing and outputting the audio signals such as sound effects by reproducing waveform data stored in the sound buffer 141; a modulation function for modulating and reproducing the waveform data stored in the sound buffer 141; and the like. By comprising these functions, the SPU 140 is constituted such that it can be used as so-called a sampling voice source that generates the audio signals such as tones and sound effects based on the waveform data stored in the sound buffer 141 according to the instruction from the main CPU 100.

In the entertainment apparatus 1, when a power source is turned on, the operating system program for the main CPU 100 and the operating system program for the IOP 120 are read from the OS-ROM 150, and severally executed by the main CPU 100 and the IOP 120. By executing the program, the main CPU 100 collectively controls each section of the entertainment apparatus 1. The IPO 120 controls input/output of signals with the controller 20 and the memory card 26. Moreover, when the operating system is carried out, the main CPU 100 controls the optical disk control section 130 after performing an initialization processing such as operation authentication to execute the application program such as the game recorded in the optical disk. By the execution of the program such as the game, the main CPU 100 controls the GP 110 and the SPU 140 to control displaying of images and generation of the sound effects and the tones in response to the player's instruction sent from the controller 20 via the IOP 120.

The hardware structure of the entertainment apparatus 1 has been described above.

Next, description will be made for the game realized by executing the program read from the inserted optical disk in the disk inserting portion 3 by the main CPU 100, in the entertainment apparatus 1.

The game realized in the entertainment apparatus 1 of the present embodiment is the game (such as an RPG, an AVG and an SLG) that progresses a story by changing subsequent development according to the player's instruction sent via the controller 20. The game displays: the game field for displaying an image (game image) that shows a story progressing in response to the player's instruction contents; the selection field for allowing the player to select a story development via the controller 20; and the caption field for displaying narration regarding the image in the game field if needed, on the display screen of the display device. Therefore, the player can enjoy variety of story developments by selecting a desired item via the selection field, while confirming the story via the game field and the caption field, which is displayed on the display screen.

First, a data structure of the optical disk will be described.

Figure 4:
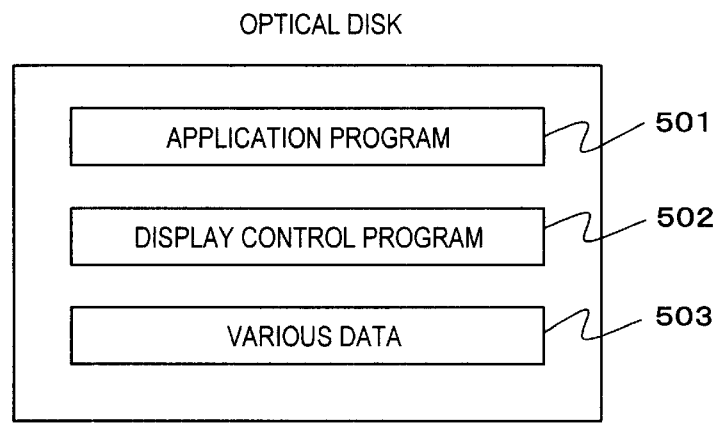
FIG. 4 is a view for explaining a data structure of an optical disk inserted to a disk inserting portion 3 of the entertainment apparatus 1.

FIG. 4 is a view explaining the data structure of the optical disk inserted in the disk inserting portion 3.

As shown in the figure, the optical disk stores: an application program (PG) 501 for realizing the game; a display control program (PG) 502 for controlling displaying of various kinds of display data items on the display device, which are generated by the application PG 501; and various kinds of data items 503 (video data, audio data, character data, texture data and the like) utilized by the application PG 501.

Next, a software structure built on the entertainment apparatus 1 will be described.

Figure 5:
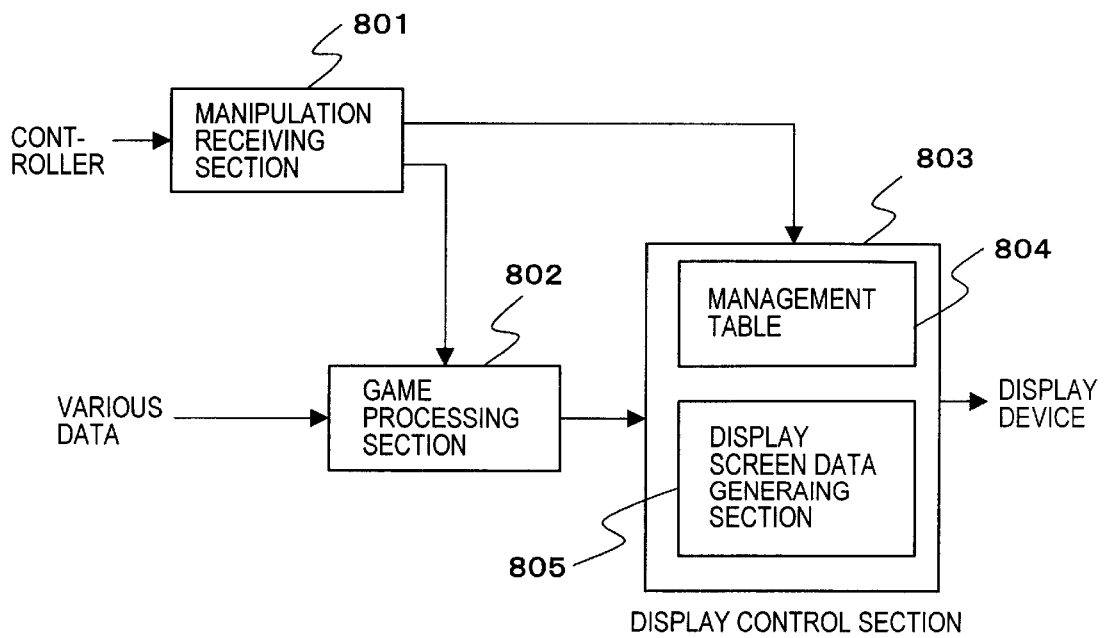
FIG. 5 is a view showing a software structure to be constructed on the entertainment apparatus 1.

FIG. 5 is a view showing the software structure built on the entertainment apparatus 1. Note that each constituent element shown in the figure is embodied as a process in such a manner that reading is performed therefor from the inserted optical disk in the disk inserting portion 3 by the optical disk control section 130, and that the main CPU 100 executes the application PG 501 and the display control PG 502 loaded on the main memory 160. Moreover, the various data items 503 stored in the optical disk are read if necessity arises, and stored into the buffer 161 in the main memory 160.

In FIG. 5, the manipulation receiving section 801 is realized by the main CPU 100 utilizing the IOP 120. The manipulation receiving section 801 transmits the player's instruction input in the controller 20 to a game processing section 802 and a display control section 803.

The game processing section 802 reads necessary data items from the buffer 161 in order to progress the story according to the player's instruction informed from the manipulation receiving section 801. Then, the game processing section 802 generates the game field data that includes images representing the story and also generates the caption field data that includes narration captions relating to the story represented by the images in the game field. In addition, the game processing section 802 generates selection field data for allowing the player to select items relating to a future story development, if necessary. And then, each of the generated field data is passed to the display control section 803. Note that the processing in the game processing section 802 is basically the same as the processing required in the conventional games such as RPGs, AVGs and SLGs.

The main CPU 100 utilizing the GP 110 realizes the display control section 803, which includes a management table (TB) 804 and a display screen data generating section 805.

Data for managing a display position, a display size and perspective (obliquity) of an image represented by each field data generated by the game processing section 802 is stored in the management TB 804.

Figure 6:
FIG. 6 is a view for explaining a data structure of a management table 804 shown in FIG. 5.

FIG. 6 is a view showing a data structure of the management TB 804.

As shown in the figure, a coordinate value (XY coordinate value) for determining the display position on the display screen, magnification for determining the display size and the perspective for determining the obliquity to right/left are registered with the management TB 804 with regard to each of the game field, the caption field and the selection field. Here, when a perspective value is positive, an object field is deformed so as to have a field that is obtained when the object field is rotated in a specified direction by an angle shown by the perspective value with a left end of the field as an axis. On the other hand, when the perspective value is negative, the object field is deformed so as to have a field that is obtained when the object field is rotated in a specified direction by an angle shown by the perspective value with a right end of the field as an axis. Such deformation can be performed by deforming the object field so as to change a ratio of lengths of the right/left sides and a magnification of lengths of the upper/lower sides of the object field. The table showing correspondent relations between the perspective value and the ratio of lengths of the right/left sides and between the perspective value and the magnification of lengths of the upper/lower sides of the object field may be stored in the game processing section 802 together with the management TB 804.

Note that, in the management TB 804, previously set values as initial values are stored in default 804a, and values set by the player are stored in a current 804b. However, when the player has not set values yet, each value registered with the default 804a is registered with the current 804b.

The display screen data generating section 805 treats each field data passed from the game processing section 802 as texture data, generates the display screen data synthesized such that each field data is displayed on the display position, with the display size and the perspective, which are registered with the current 804b of the management TB 804, and outputs the same to the display device. On receiving the data, the display device displays an image according to the display screen data on the display screen.

Next, operations of the software structure built on the entertainment apparatus 1 will be described.

Figure 7:
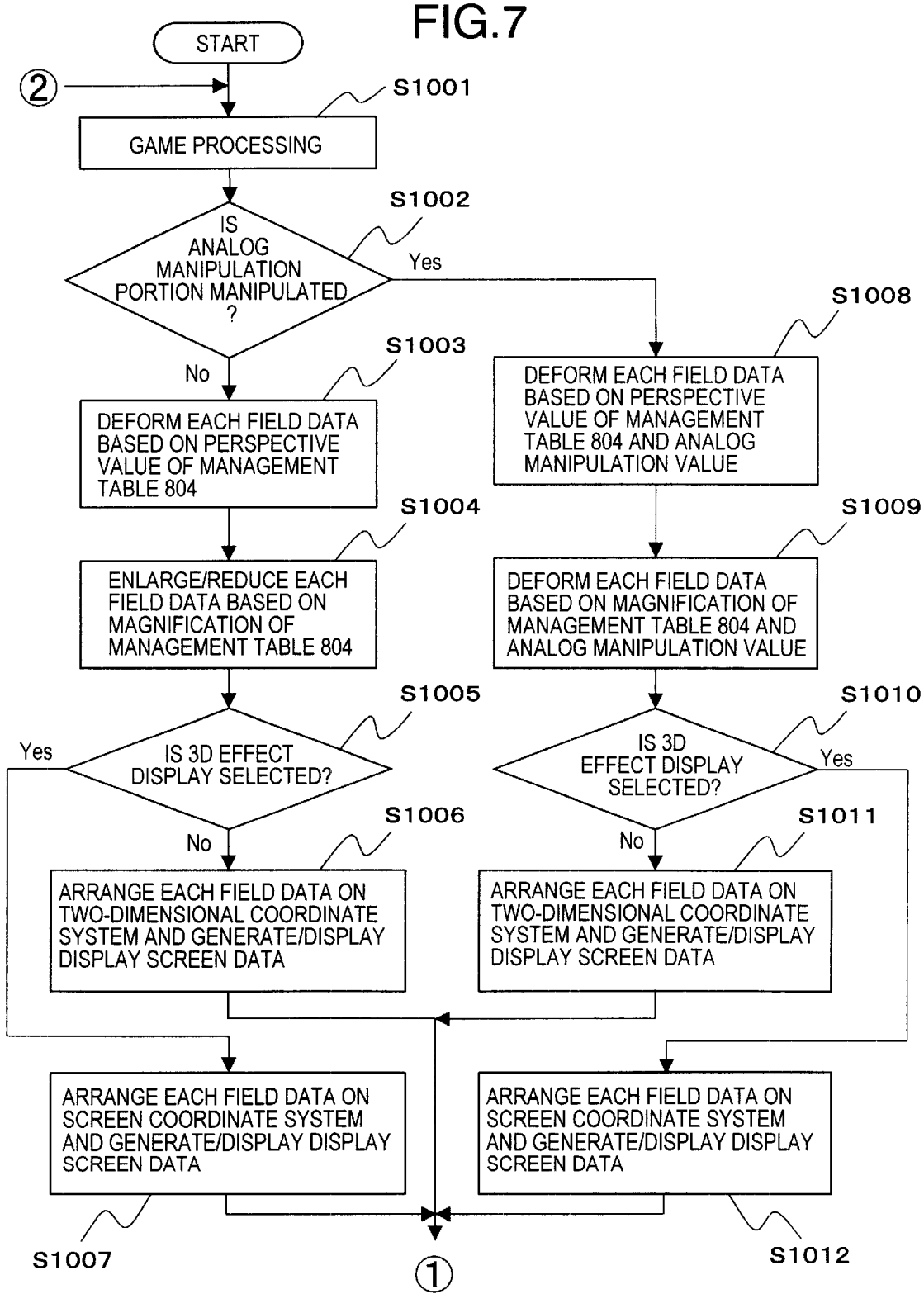
FIG. 7 is a flowchart for explaining an operation of the software structure constructed on the entertainment apparatus 1.
Figure 8:
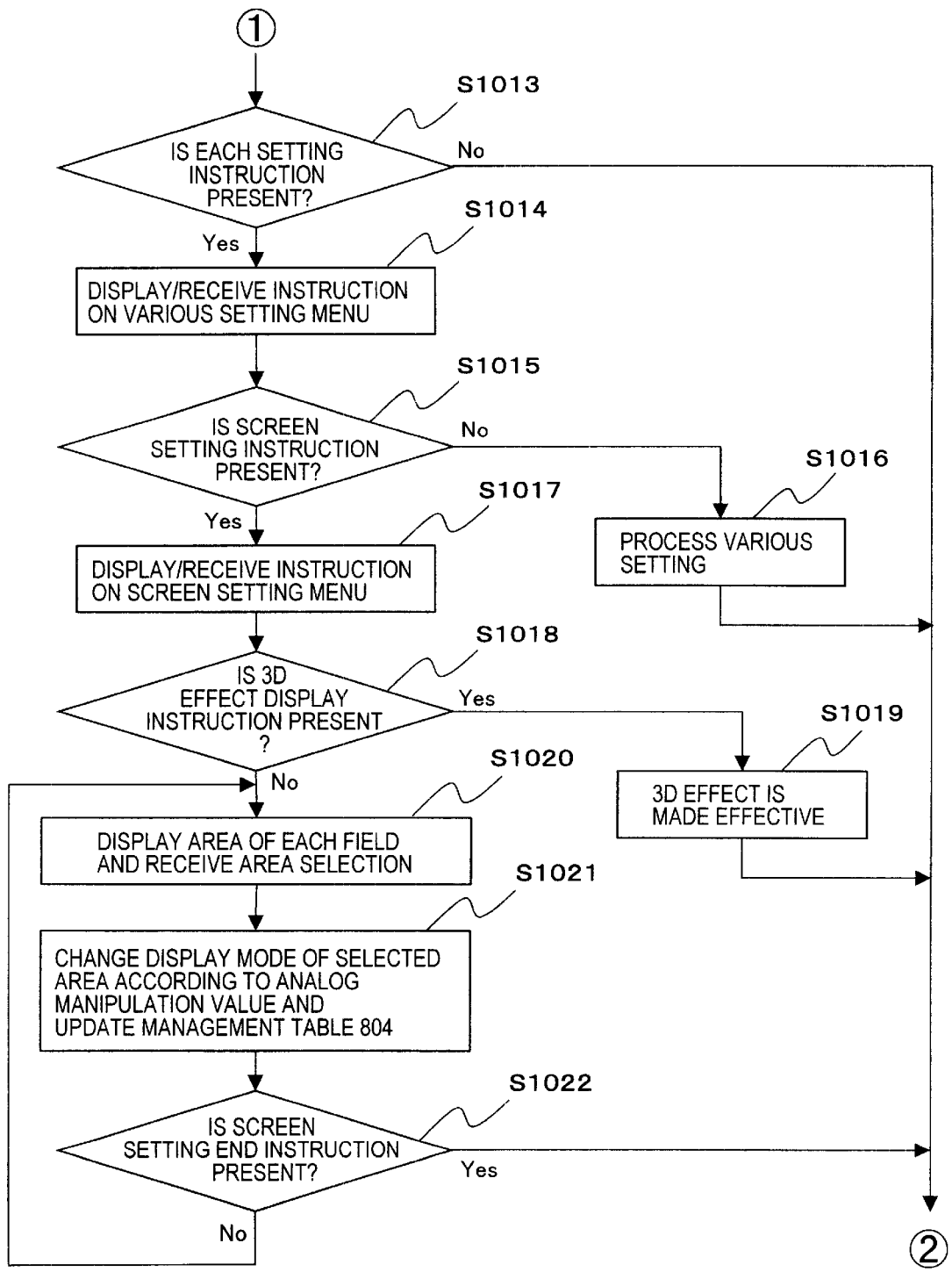
FIG. 8 is a flowchart for explaining an operation of the software structure constructed on the entertainment apparatus 1.

FIGS. 7 and 8 are flowcharts for explaining the operations of the software structure built on the entertainment apparatus 1.

Note that, in the following description, the controller 20 has the analog manipulation portions 31 and 32 assigned to manipulate display change of the game field, the caption field and the selection field. And, the controller 20 has the other buttons assigned to manipulate other various settings and a game execution. Specifically, when a signal ascribed to the manipulation of the analog manipulation portions 31 and 32 is sent from the controller 20, the manipulation receiving section 801 sends the signal to the display control section 803. On the other hand, when a signal ascribed to the manipulation of the other buttons is sent from the controller 20, the manipulation receiving section 801 sends the signal to the game processing section 802.

First, the game processing section 802 identifies manipulation contents of the player based on the signal sent from the manipulation receiving section 801. Then, the game processing section 802 performs processing according to the manipulation contents, reads necessary data from the buffer 161 in order to progress a game story, and generates the game field data including an image representing the story. Moreover, the game processing section 802 generates the caption field data that includes narration captions relating to the story represented by the image in the game field, or generates the selection field data for allowing the player to select items relating to a future story development. And then, each of the generated field data is passed to the display control section 803 (step S1001).

On receiving the data, if the signal ascribed to the manipulation of the analog manipulation portions 31 and 32 is not sent from the controller 20 via the manipulation receiving section 801 ("No" in step S1002), the display screen data generating section 805 of the display control section 803 treats each field data passed from the game processing section 802 as the texture data, generates the display screen data obtained by synthesizing each field data based on the values registered with the current 804b of the management TB 804, and outputs the same to the display device (steps S1003 to S1007).

Specifically, with regard to each field data passed from the game processing section 802, the ratio of lengths of the right/left sides and the magnification of lengths of the upper/lower sides are changed based on the perspective values registered with the current 804b of the management TB 804. Each field data is thereby deformed (step S1003).

Next, each field data deformed as described above is enlarged/reduced in the magnification registered with the current 804b of the management TB 804 (step S1004).

Subsequently, the display control section 803 checks whether or not a 3D effect display is selected by the player (step S1005). In this case, the 3D effect display implies displaying each of the game field, the caption field and the selection field on the display screen of the display device with a sense of depth.

In the case where the 3D effect display is not selected in step S1005, each field data (texture data) deformed and enlarged/reduced as described above is arranged in order on the two-dimensional coordinate system according to the XY coordinate values registered with the current 804b of the management TB 804, whereby the display screen data obtained by synthesizing each field data is generated (step S1006). Then, the generated display screen data is output to the display device and displayed thereon.

On the other hand, in the case where the 3D effect display is selected in step S1005, each field data (texture data) deformed and enlarged/reduced as described above is arranged in order on the screen coordinate system according to the XY coordinate values registered with the current 804b of the management TB 804 and according to the previously set Z coordinate values for the game field data, the caption field data and the selection field data, whereby the display screen data obtained by synthesizing each field data is generated (step S1007). Then, the generated display screen data is output to the display device and displayed thereon.

In this step, to allow each of the game field, the caption field and the selection field to have a sense of depth, the game field data, for example, may be arranged on a plurality of other screen coordinate values in addition to the screen coordinate values specified by the XY coordinate values registered with the current 804b of the management TB 804 and the previously set Z coordinate values for the game field data, so that the display screen data is generated. Alternatively, in addition to each field data deformed and enlarged/reduced as described above, texture data prepared in advance (such as texture data representing stars, clouds and snow) may be arranged on the plurality of screen coordinate values, so that the display screen data is generated. Here, the plurality of screen coordinate values may be previously specified or randomly specified every time the display screen data is generated.

Figure 9:
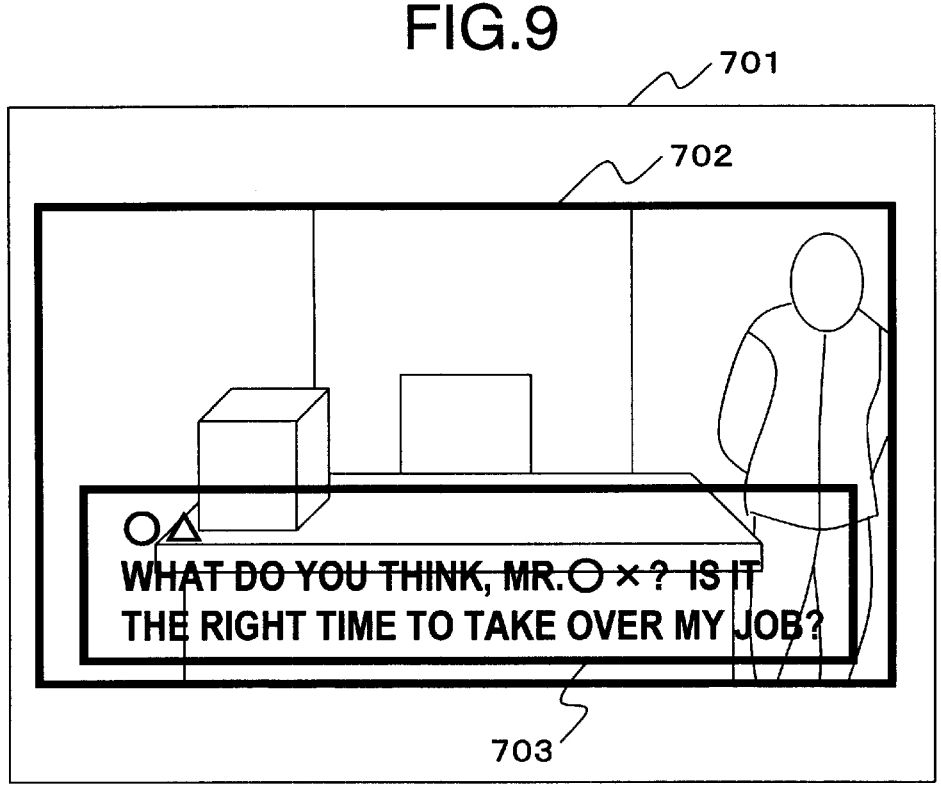
FIG. 9 is a view showing an image example displayed on the display screen of the display device in the case where a display control section 803 shown in FIG. 5 generates the display screen data without a 3D effect display.
Figure 10:
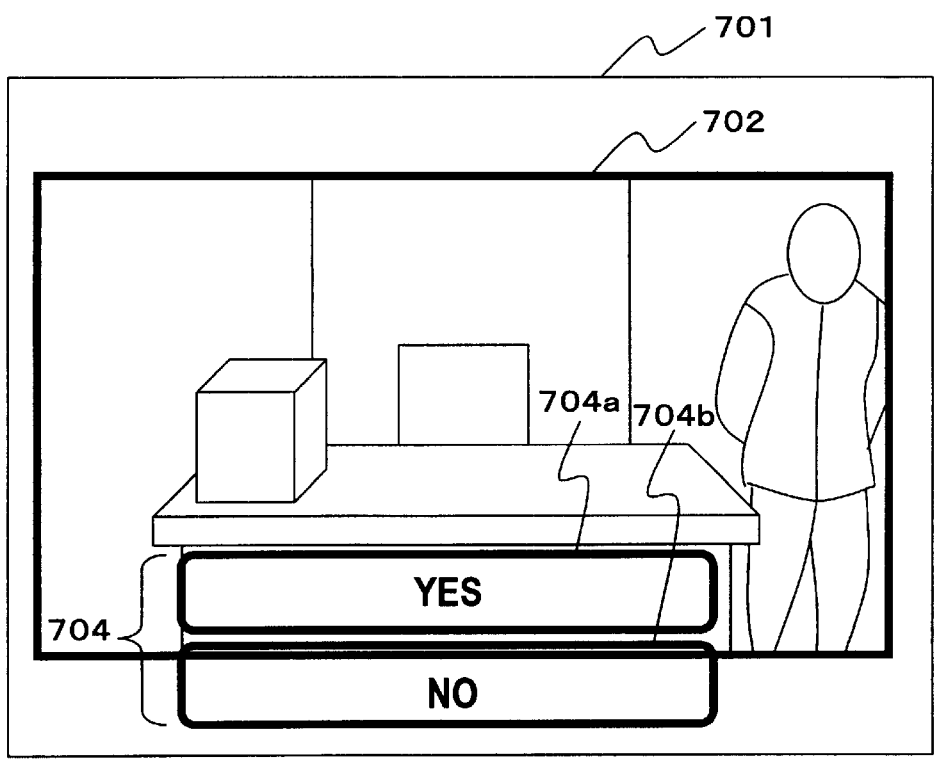
FIG. 10 is a view showing another image example displayed on the display screen of the display device in the case where the display control section 803 shown in FIG. 5 generates the display screen data without the 3D effect display.

FIGS. 9 and 10 show examples of the images displayed on the display screen of the display device when the display control section 803 generates the display screen data without the 3D effect display. FIG. 9 shows an aspect where a game field 702 and a caption field 703 are displayed on a display screen 701, and FIG. 10 shows an aspect where the game field 702 and a selection field 704 are displayed on the display screen 701. It is regarded that each value registered with the default 804a is registered with the current 804b of the management TB 804. The player can select a desired item out of items 704a and 704b of the selection field 704 by manipulating the controller 20. As described above, the game processing section 802 identifies the manipulation contents of the player based on the signal sent from the manipulation receiving section 801. For example, the game processing section 802 identifies which item of the selection field 704 has been selected, and determines data to be read from the buffer 161 according to the selected item. Then, the game processing section 802 reads the data, generates data of the game field 702 including the image that represents the story, as well as data of the caption field 703 or the selection field 704, passes the same to the display control section 803, and displays the same on the display device.

Figure 11:
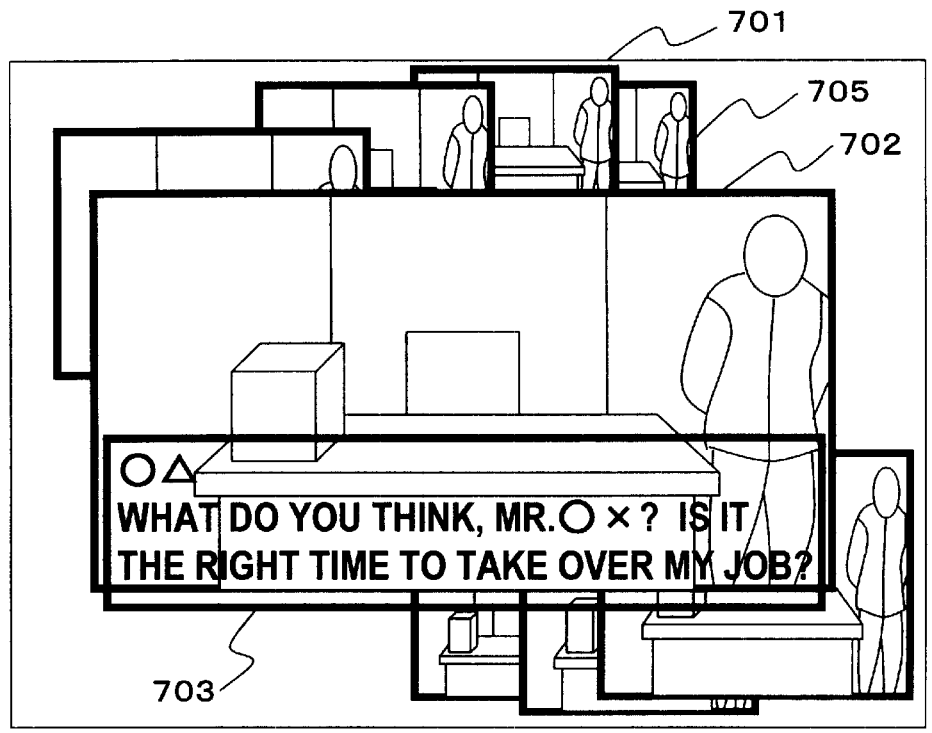
FIG. 11 is a view showing an image example displayed on the display screen of the display device in the case where the display control section 803 shown in FIG. 5 generates the display screen data with the 3D effect display.
Figure 12:
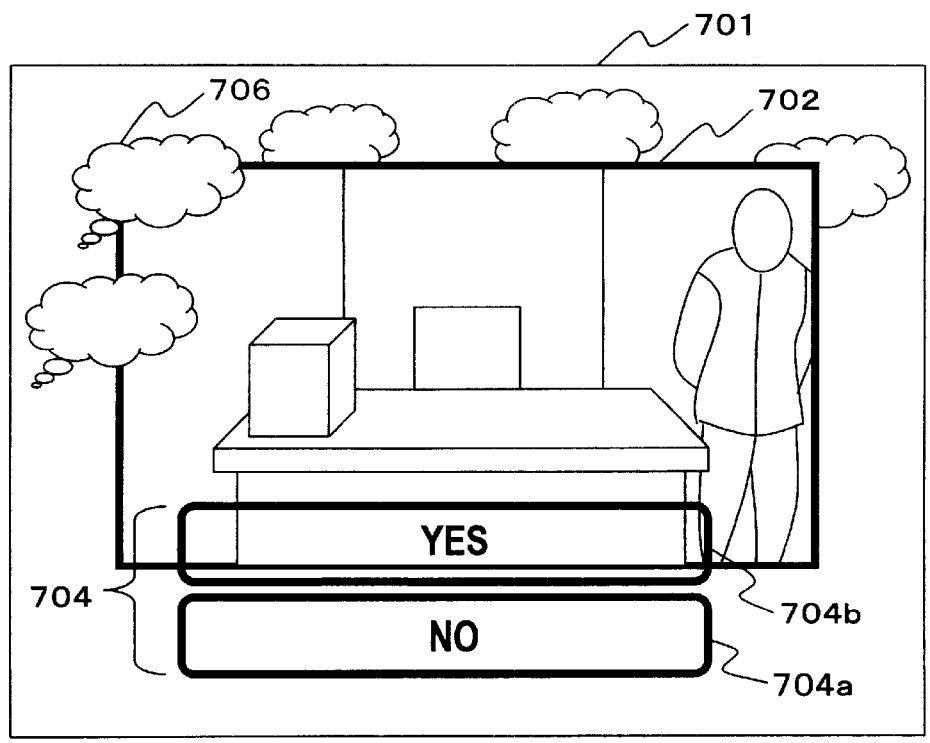
FIG. 12 is a view showing another image example displayed on the display screen of the display device in the case where the display control section 803 shown in FIG. 5 generates the display screen data with the 3D effect display.

FIGS. 11 and 12 show examples of the images displayed on the display screen of the display device when the display control section 803 generates the display screen data with the 3D effect display. FIG. 11 shows an aspect where the game field 702 and the caption field 703 are displayed on the display screen 701, and further shows an aspect where copies 705 of the game field 702 are arranged on the plurality of screen coordinate values that are previously or randomly set in order to allow each of the game field 702 and the caption field 703 to have a sense of depth. Moreover, FIG. 12 shows an aspect where the game field 702 and the selection field 704 are displayed on the display screen 701, and further shows an aspect where texture data 706 representing clouds is arranged on the plurality of screen coordinate values that are previously or randomly set in order to allow each of the game field 702 and the selection field 704 to have a sense of depth. Note that as shown in FIG. 11 and 12, the player may be allowed to select as to which is displayed, plural copies of the game field 702 or a plurality of specified texture data, together with the selection of with or without the 3D effect display.

On the other hand, in the case where the signal ascribed to the manipulation of the analog manipulation portions 31 and 32 is sent from the controller 20 via the manipulation receiving section 801 in step S1002, the display screen data generating section 805 treats each field data passed from the game processing section 802 as the texture data, generates the display screen data obtained by synthesizing the respective field data on the basis of the values registered with the current 804*b* of the management TB 804 and the signal ascribed to the manipulation of the analog manipulation portions 31 and 32 of the controller 20, and outputs the display screen data to the display device (steps S1008 to S1012).

Specifically, with regard to each field data other than the game field data passed from the game processing section 802, the ratio of lengths of the right/left sides and the magnification of lengths of the upper/lower sides are first changed based on the perspective values registered with the current 804*b* of the management TB 804. In addition, regarding the game field data out of the field data passed from the game processing section 802, the ratio of lengths of the right/left sides and the magnification of lengths of the upper/lower sides are changed based on an addition of the perspective value registered with the current 804*b* of the management TB 804 and the perspective value identified by the signal ascribed to the manipulation of the analog manipulation portions 31 and 32 of the controller 20, which is sent from the manipulation receiving section 801. For example, when a tilting manipulation to the manipulation stick 32*a* of the analog manipulation portion 32 to right/left is made to correspond to the perspective value of the game field, the tilt of the manipulation stick 32*a* to right/left is detected by the signal sent from the manipulation receiving section 801, whereby the perspective value corresponding to the tilt is identified. Then, an addition of the identified perspective value and the perspective value registered with the current 804*b* of the management TB 804 is obtained, and the ratio of lengths of the right/left sides and the magnification of lengths of the upper/lower sides of the game field data are changed on the basis of the addition. Each field data passed from the game processing section 802 is thereby deformed (step S1008).

Next, among the field data deformed as described above, the field data other than the game field data is enlarged/reduced by the magnification registered with the current 804*b* of the management TB 804. The game field data is enlarged/reduced on the basis of a multiplied value of the magnification registered with the current 804*b* of the management TB 804 and the magnification identified by the signal ascribed to the manipulation of the analog manipulation portions 31 and 32 of the controller 20, which is sent from the manipulation receiving section 801. For example, when the tilting manipulation to the manipulation stick 32*a* of the analog manipulation portion 32 to up/down is made to correspond to the magnification of the game field, the tilt of the manipulation stick 32*a* to up/down is detected by the signal sent from the manipulation receiving section 801, whereby the magnification corresponding to the tilt is identified. Then, a multiplied value of the identified magnification and the magnification registered with the current 804*b* of the management TB 804 is obtained, and the game field data is enlarged/reduced on the basis of the value obtained. Each size of the field data is thereby changed (step S1009).

Subsequently, the display control section 803 checks whether or not the 3D effect display is selected by the player (step S1010).

In the case where the 3D effect display is not selected in step S1010, among the field data (texture data) that has been deformed and enlarged/reduced as described above, the display positions of the field data other than the game field data are determined in the XY coordinate values registered with the current 804*b* of the management TB 804. Regarding the game field data, its display position is determined in the addition of the XY coordinate value registered with the current 804*b* of the management TB 804 and the XY coordinate value identified by the signal ascribed to the manipulation of the analog manipulation portions 31 and 32 of the controller 20, which is sent from the manipulation receiving section 801. For example, when the tilting manipulation of the manipulation stick 31*a* of the analog manipulation portion 31 to up/down and right/left is made to correspond to the display position (the XY coordinate value) of the game field, the tilt of the manipulation stick 31*a* to up/down and right/left is detected by the signal sent from the manipulation receiving section 801, and the XY coordinate value corresponding to the tilt is identified. Then, the addition of the identified XY coordinate value and the XY coordinate value registered with the current 804*b* of the management TB 804 is obtained, and the addition is determined as the display position of the game field. Next, each field data is arranged in order on the two-dimensional coordinate system according to the XY coordinate values determined as described above, whereby the display screen data obtained by synthesizing each field data is generated (step S1011). Then, the generated display screen data is output to the display device and displayed thereon.

On the other hand, when the 3D effect display is selected in step S1010, among the field data (texture data) that has been deformed and enlarged/reduced as described above, the display positions of the field data other than the game field data are determined in the XYZ coordinate values defined by the XY coordinate values registered with the current 804b of the management TB 804 and the Z coordinate values that are previously set for each of the caption field data and the selection field data. Regarding the game field data, its display position is determined to the XYZ coordinate value defined by the XY coordinate value as the addition of the XY coordinate value registered with the current 804b of the management TB 804 and the XY coordinate value identified by the signal ascribed to the manipulation of the analog manipulation portions 31 and 32 of the controller 20, which is sent from the manipulation receiving section 801, and by the Z coordinate value that is previously set for the game field data. Next, each field data is arranged in order on the screen coordinate system according to the XYZ coordinate value determined as described above, whereby the display screen data obtained by synthesizing each field data is generated (step S1012). Then, the generated display screen data is output to the display device and displayed thereon. In this case, as described in step S1007, for example, the display screen data may be generated by arranging plural copies of the game field 702 or specified texture data on the screen coordinate system in order to allow each of the game field, the caption field and the selection field to have a sense of depth.

Figure 13:
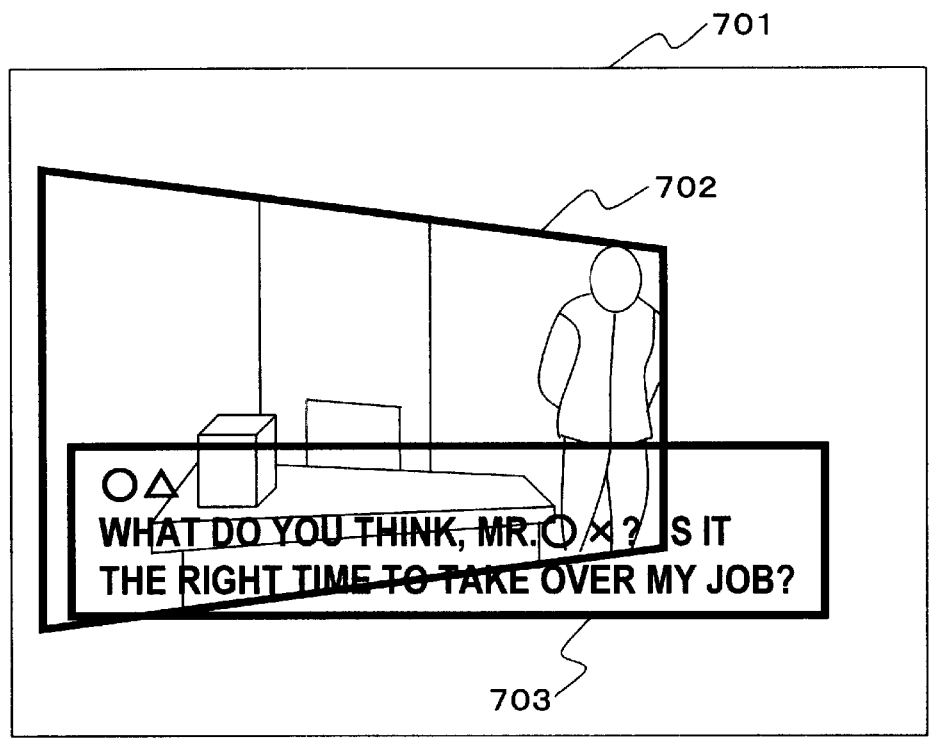
FIG. 13 is a view showing an aspect where analog control portions 31 and 32 of the controller 20 are controlled by a player in FIG. 9 and display of a game field 702 is consequently changed.
Figure 14:
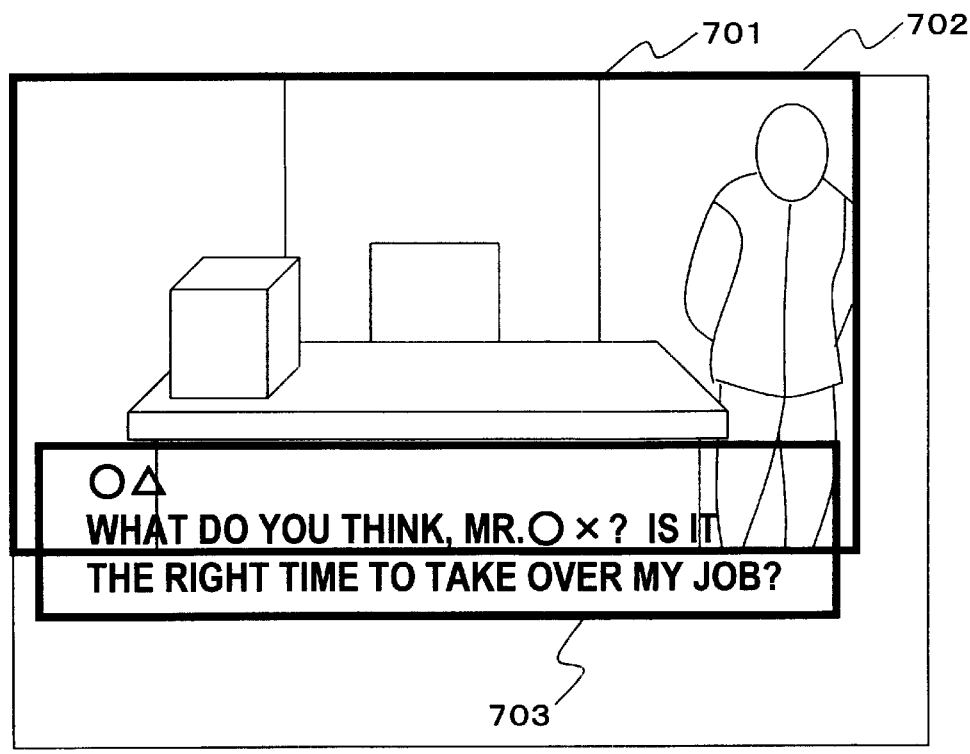
FIG. 14 is a view showing another aspect where the analog control portions 31 and 32 of the controller 20 are controlled by the player in FIG. 9 and display of the game field 702 is consequently changed.

FIGS. 13 and 14 show aspects where the analog manipulation portions 31 and 32 of the controller 20 were manipulated by the player in FIG. 9 and the display of the game field 702 has been changed as a result. FIG. 13 shows an aspect where the game field 702 is transformed into the perspective (obliquity) by the player's manipulation of the analog manipulation portions 31 and 32. FIG. 14 shows an aspect where the display position of the game field 702 is changed by the player's manipulation of the analog manipulation portions 31 and 32.

Figure 15:
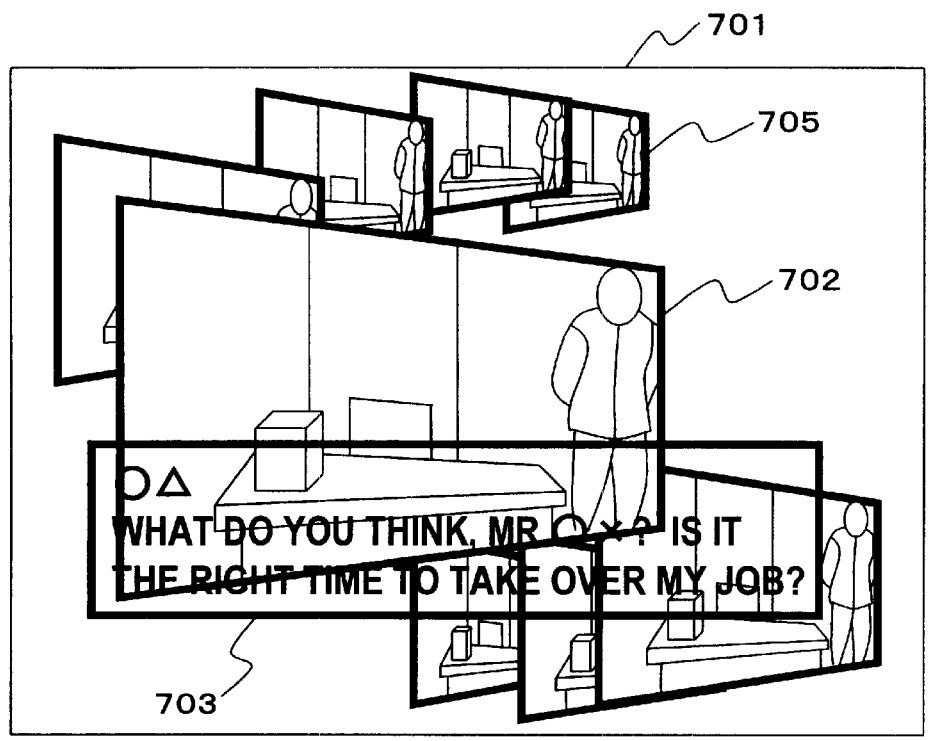
FIG. 15 is a view showing an aspect where the analog control portions 31 and 32 of the controller 20 are controlled by the player in FIG. 11 and display of the game field 702 is changed.
Figure 16:
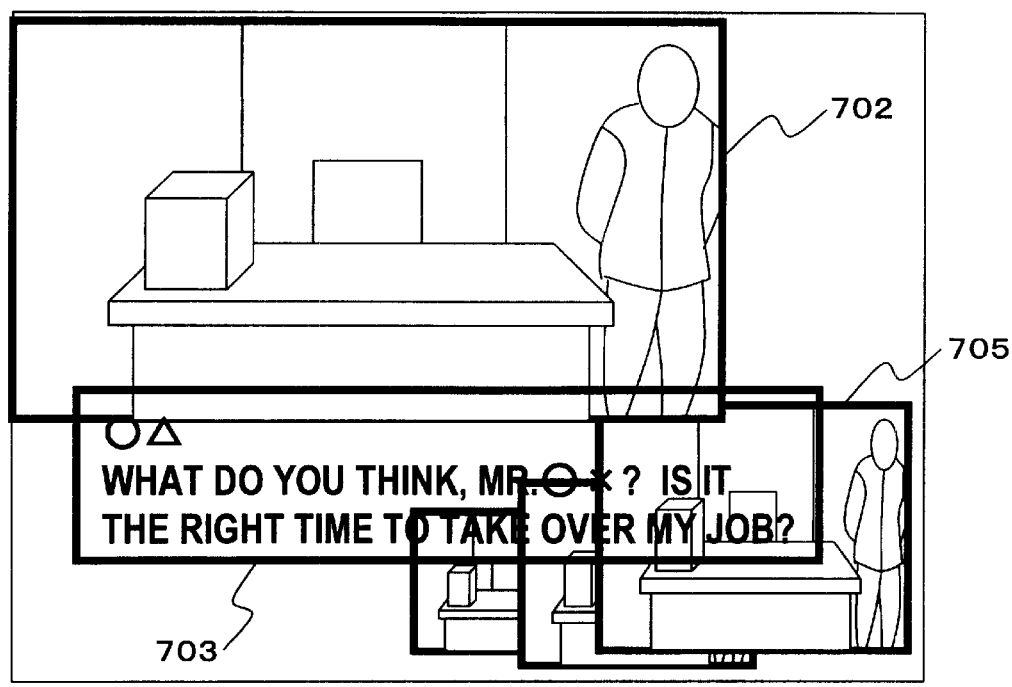
FIG. 16 is a view showing another aspect where the analog control portions 31 and 32 of the controller 20 are controlled by the player in FIG. 11 and display of the game field 702 is changed.

In addition, FIGS. 15 and 16 show aspects where the analog manipulation portions 31 and 32 of the controller 20 were manipulated by the player in FIG. 11 and the display of the game field 702 has been changed as a result. FIG. 15 shows an aspect where the game field 702 is transformed into the perspective (obliquity) by the player's manipulation of the analog manipulation portions 31 and 32, and FIG. 16 shows an aspect where the display position of the game field 702 is changed by the player's manipulation of the analog manipulation portions 31 and 32.

Figure 17:
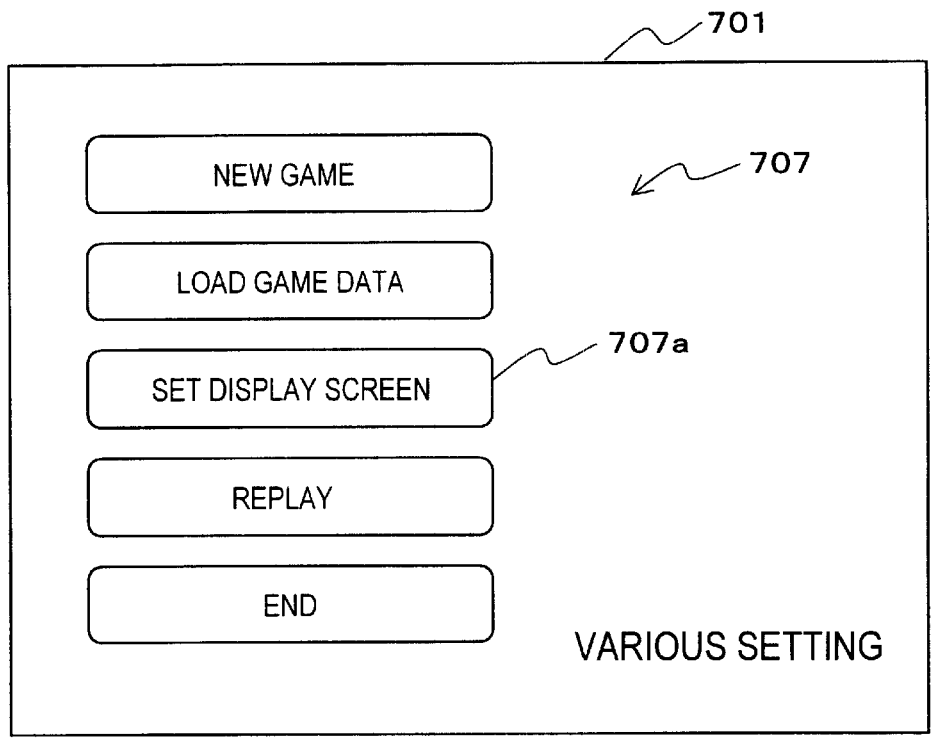
FIG. 17 is a view showing examples of various setting menus displayed on the display device by processing in step S1014 of FIG. 8.

Now, in a state where the game is being executed by the player as described above, on receiving the signal ascribed to the manipulation of a button (a selection button 25, for example) assigned for receiving various setting instructions of the game from the controller 20 via the manipulation receiving section 801 (step S1013), the game processing section 802 stops the processing for game execution and moves from a game mode to a setting mode for enabling the player to execute various settings. Then, the game processing section 802 controls the display control section 803 to display, for example, various setting menus 707 as shown in FIG. 17 on the display device, and allows the player to select a desired item in the various setting menus 707 via the controller 20 (step S1014).

Next, when an item 707a for setting a display screen is selected in step S1015, then the game processing section 802 proceeds to step S1017. When another item is selected, the processing according to the selected item is performed (step S1016), and the game processing section 802 returns to step S1001 and moves to the game mode.

Figure 18:
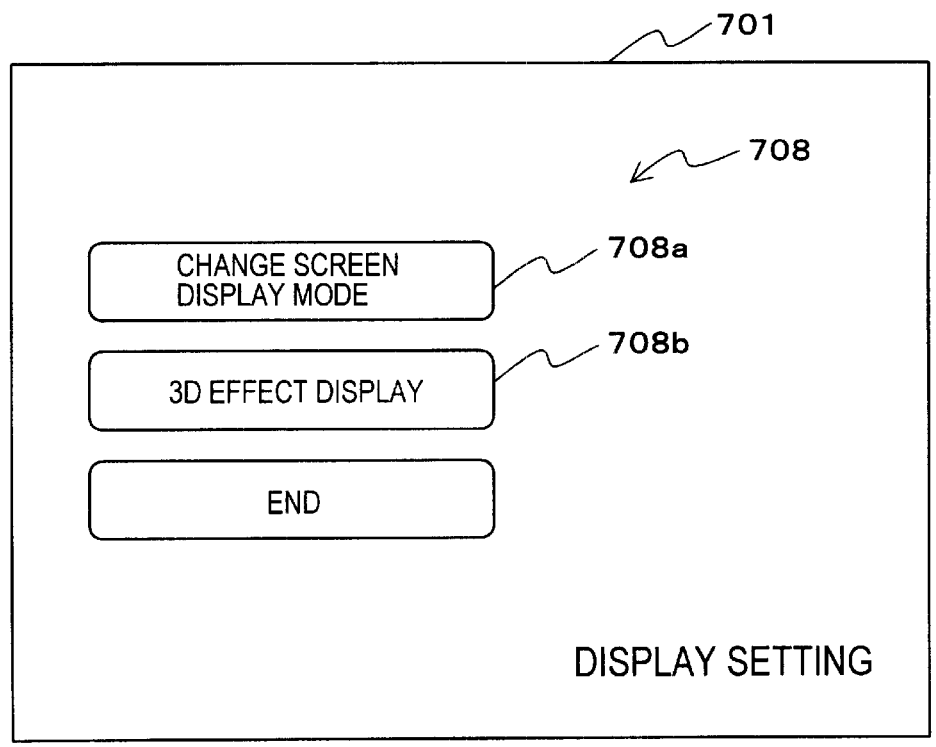
FIG. 18 is a view showing various setting menus displayed on the display device by processing in step S1017 of FIG. 8.

In step S1017, the game processing section 802 controls the display control section 803 to display, for example, a display screen setting menu 708 as shown in FIG. 18 on the display device. The game processing section 802 allows the player to select either an item 708a for changing the display mode of each of the game field 702, the caption field 703 and the selection field 704, or an item 708b for using the 3D effect display on the display of each field on the display device, via the controller 20.

Next, when the item for the 3D effect display is selected in step S1018, the game processing section 802 notifies the display control section 803 of the selection to allow the 3D effect display to become effective (step S1019), then returns to step S1001 and moves to the game mode. Note that, when the item for the 3D effect display is selected, as previously described with reference to FIGS. 11 and 12, a menu for selecting the display of plural copies of the game field 702 or the display of a plurality of specified texture data may be further displayed to allow the player to select via the controller 20.

On the other hand, when the item for changing display mode of the game field 702, the caption field 703 and the selection field 704 is selected, the game processing section 802 controls the display control section 803 to display the display areas of the game field 702, the caption field 703 and the selection field 704 on the display screen 701 of the display device. Then, the game processing section 802 allows the player to select the display area of the field for changing display mode (step S1020).

Figure 19:
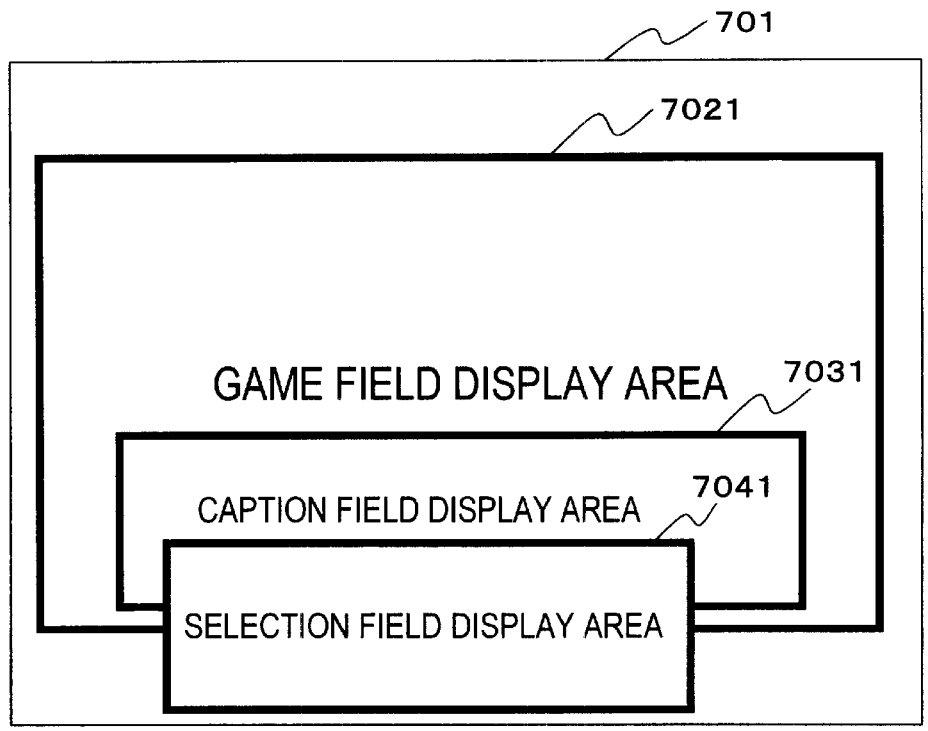
FIG. 19 is a view showing an example of display areas of a game field, a caption field and a selection field that are displayed on the display screen of the display device by processing in steps S1020 to S1022 of FIG. 8.

FIG. 19 shows examples of display areas 7021, 7031 and 7041 for the game field 702, the caption field 703 and the selection field 704 respectively, which are displayed on the display screen 701 of the display device by the display control section 803. The display control section 803 determines the display areas 7021, 7031 and 7041 for the game field 702, the caption field 703 and the selection field 704 respectively based on the data sizes of the game field data, the caption field data and the selection field data passed from the game processing section 802, and based on the values registered respectively with the current 804b of the management TB 804, and displays the same on the display screen 701. Here, each data size of the game field data, the caption field data and the selection field data passed from the game processing section 802 may be kept beforehand in the display control section 803 together with the management TB 804. The player can select a desired display area among the display areas 7021, 7031 and 7041 by manipulating the controller 20. The game processing section 802 notifies the display control section 803 of the display area selected by the player.

On receiving the notification, the display screen data generating section 805 of the display control section 803 changes and updates each value registered with the current 804b of the management TB 804 with regard to the field data of the display area selected by the player based on the signal ascribed to the manipulation of the analog manipulation portions 31 and 32 of the controller 20, which has been sent from the manipulation receiving section 801 (step S1021). At the same time, the display screen data generating section 805 changes the display mode of the display area on the display screen 701 based on each of the updated values registered with the current 804b of the management TB 804.

For example, when the player selects the display area 7021 of the game field 702, each value in the current 804b of the management TB 804 is updated as described below.

Specifically, in the display screen data generating section 805, first, the perspective value of the game field registered with the current 804b of the management TB 804 is added to the perspective value identified by the signal ascribed to the manipulation of the analog manipulation portions 31 and 32 of the controller 20, which has been sent from the manipulation receiving section 801, and then, the perspective value of the game field in the current 804*b* is updated. For example, in the case where the tilting manipulation to the manipulation stick 32*a* of the analog manipulation portion 32 to right/left is made to correspond to the perspective value, the tilt of the manipulation stick 32*a* to right/left is detected by the signal sent from the manipulation receiving section 801, whereby the perspective value made to correspond to the tilt is identified. Then, the identified perspective value is added to the perspective value registered with the current 804*b* of the management TB 804, whereby the perspective value of the game field in the current 804*b* is updated.

Next, the display screen data generating section 805 multiplies the magnification of the game field registered with the current 804*b* of the management TB 804 by the magnification identified by the signal ascribed to the manipulation of the analog manipulation portions 31 and 32 of the controller 20, which is sent from the manipulation receiving section 801, then updates the magnification of the game field in the current 804*b*. For example, in the case where the tilting manipulation to the manipulation stick 32*a* of the analog manipulation portion 32 to up/down is made to correspond to the magnification, the tilt of the manipulation stick 32*a* to up/down is detected by the signal sent from the manipulation receiving section 801, whereby the magnification made to correspond to the tilt is identified. Then, the identified magnification is multiplied by the magnification registered with the current 804*b* of the management TB 804. The magnification of the game field in the current 804*b* is thereby updated.

Next, the display screen data generating section 805 adds the display position (XY coordinate value) of the game field registered with the current 804*b* of the management TB 804 to the XY coordinate value identified by the signal ascribed to the manipulation of the analog manipulation portions 31 and 32 of the controller 20, which is sent from the manipulation receiving section 801, whereby updates the XY coordinate value of the game field in the current 804*b*. For example, in the case where the tilting manipulation to the manipulation stick 31*a* of the analog manipulation portion 31 to up/down and right/left is made to correspond to the XY coordinate value, the tilt of the manipulation stick 31*a* to up/down and right/left is detected by the signal sent from the manipulation receiving section 801, whereby the XY coordinate value made to correspond to the tilt is identified. Then, the identified XY coordinate value is added to the XY coordinate value registered with the current 804*b* of the management TB 804. The display position (XY coordinate value) of the game field in the current 804*b* is thereby updated.

Further, the display screen data generating section 805 determines the display area 7021 of the game field based on each value of the game field registered with the current 804*b* of the management TB 804, which has been updated as described above, and based on the data size of the game field data. The display mode of the area 7021 on the display screen 701 is thereby updated.

When the game processing section 802 receives the signal ascribed to the manipulation of a button (a selection button 25, for example) that is assigned for receiving various setting instructions of the display screen from the controller 20 via the manipulation receiving section 801 (step S1022), the game processing section 802 returns to step S1001 and moves to the game mode.

Note that, in FIG. 18, when an item for initializing the display mode of the game field, the caption field and the selection field is added to the display screen setting menu 708 and the item is selected in step S1018, the registered values with the current 804*b* of the management TB 804 may be reset to the registered values of the default 804*a*, and the game processing section 802 may move to step S1001.

Figure 20:
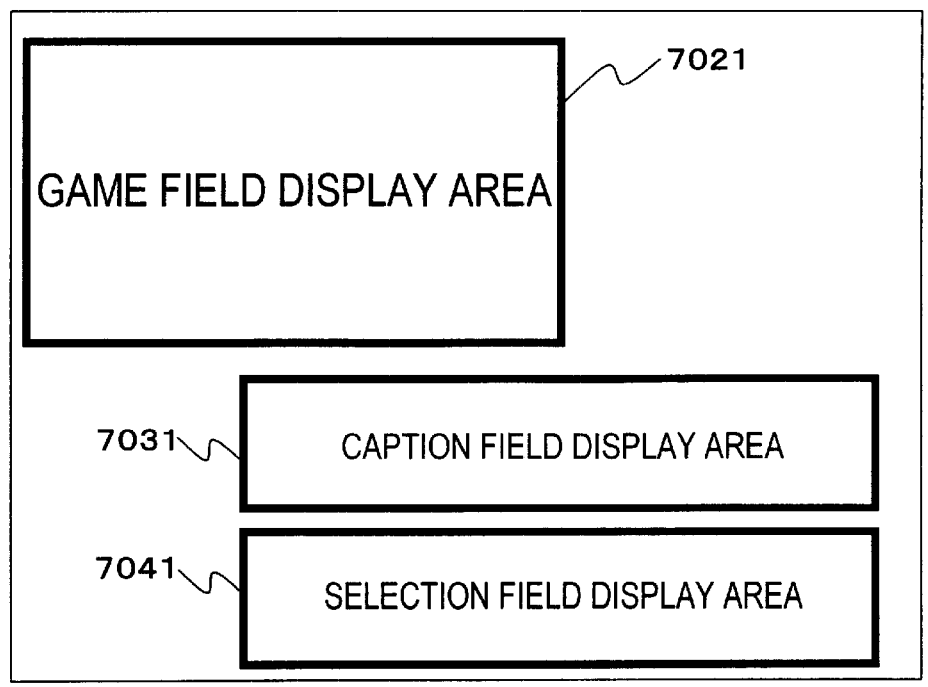
FIG. 20 is a view showing another example of the display areas of the game field, the caption field and the selection field that are displayed on the display screen of the display device by processing in steps S1020 to S1022 of FIG. 8.
Figure 21:
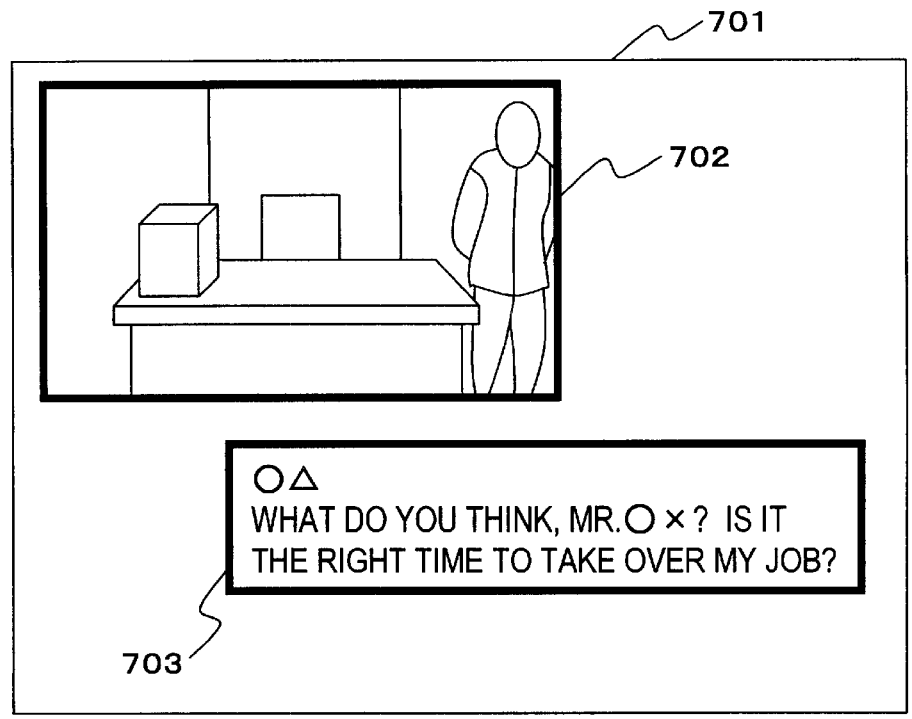
FIG. 21 is a view showing an image example displayed on the display screen of the display device in the case where the display control section 803 shown in FIG. 5 generates the display screen data without the 3D effect display after the display areas of the game field, the caption field and the selection field are updated as shown in FIG. 20.
Figure 22:
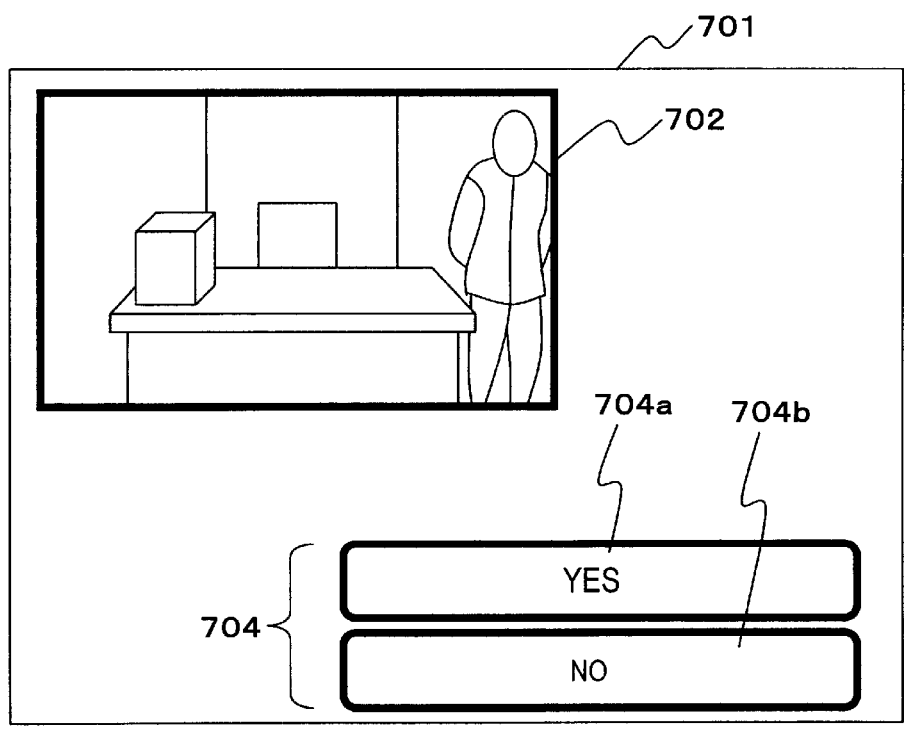
FIG. 22 is a view showing another image example displayed on the display screen of the display device in the case where the display control section 803 shown in FIG. 5 generates the display screen data without the 3D effect display after the display areas of the game field, the caption field and the selection field are updated as shown in FIG. 20.

FIG. 20 shows an aspect where the display mode of the display areas 7021, 7031 and 7041 of the game field 702, the caption field 703 and the selection field 704 respectively shown in FIG. 19 have been changed by the processing in the above step S1020 to step S1022. And, FIGS. 21 and 22 show examples of the images displayed on the display screen 701 of the display device in the case where the display control section 803 generates the display screen data without the 3D effect after the display areas 7021, 7031 and 7041 of the game field 702, the caption field 703 and the selection field 704 respectively have been updated as shown in FIG. 20.

The embodiment of the present invention has been described above.

According to the embodiment, the display modes of the display positions, the display sizes, the perspectives and the like with regard to the game field 702, the caption field 703 and the selection field 704 on the display screen 701 of the display device can be customized. Therefore, the player can customize the display modes of the game field 702, the caption field 703 and the selection field 704 by adjusting the modes to the characteristics (such as the size and the aspect ratio of the display screen) of the display device connected to the entertainment apparatus 1. Accordingly, user-friendliness for the player can be improved.

Moreover, in the embodiment, while the analog manipulation portions 31 and 32 of the controller 20 receive manipulation in a game mode (a state where the player executes a game), the display mode of the game field 702 can be customized according to the manipulation contents. Therefore, for example, in the case where a secret as a clue for the subsequent story development is displayed on a portion of the game field 702, when the secret portion is hidden behind the caption field 703 or the selection field 704, the player can immediately confirm the portion by changing the display mode of the game field 702 by use of the controller 20. Thus, the user-friendliness for the player can be improved. Note that, in the embodiment, in the case where the analog manipulation portions 31 and 32 of the controller 20 do not receive manipulation during the game mode, the display mode of the game field 702 is determined based only on the values registered with the current 804*b* of the management TB 804. Accordingly, even when the display mode of the game field 702 is changed by manipulating the analog manipulation portions 31 and 32, the player can restore the display mode to the original by discontinuing manipulation of the analog manipulation portions 31 and 32.

Moreover, in the embodiment, each of the game field 702, the caption field 703 and the selection field 704 can be displayed three-dimensionally (with a sense of depth). As described above, figuration for enhancing visual effects is given not only to the image displayed on the game field 702 but also to displaying of the game field 702, the caption field 703 and the selection field 704, which can appeal more strongly to the player's eyes, and the visuals become more entertaining thereby.

Note that the present invention is not limited to the embodiment described above, and various modifications can be made within the scope of the gist of the invention.

For example, in step S1020 to step S1022 of FIG. 8, the display control section 803 displays the display areas 7021, 7031 and 7041 on the display screen 701. Here, each of the display areas 7021, 7031 and 7041 is determined by the data size of each display data and each value registered with the current 804b of the management TB 804, as shown in FIG. 19 and 20. However, in step S1001 of FIG. 7, the display control section 803 is allowed to store the latest field data for each field passed from the game processing section 802. Then, on step S1020 of FIG. 8, the display control section 803 may be allowed to generate the display areas 7021, 7031 and 7041 including images of the field data based on each data registered with the current 804b of the management TB 804, whereby the display areas may be displayed on the display screen 701.

Figure 23:
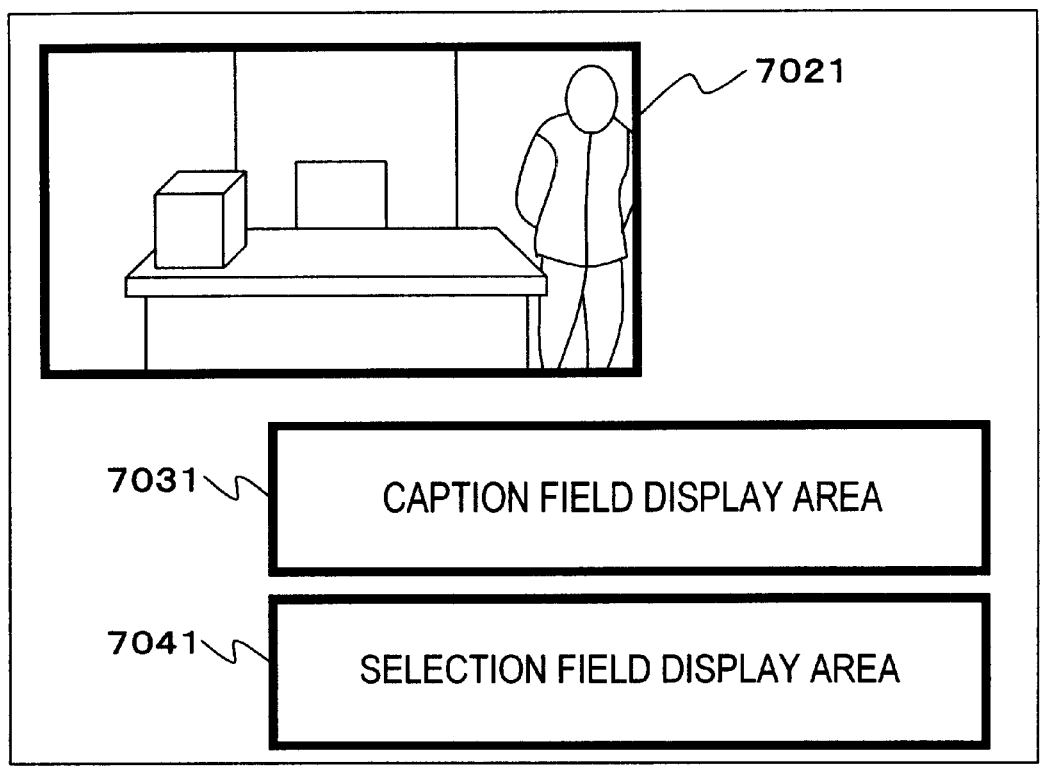
FIG. 23 is a view showing a modification of the display areas of the game field, the caption field and the selection field shown in FIG. 20.

FIG. 23 shows an example of the case where the latest game field data passed from the game processing section 802 is stored in step S1001 of FIG. 7 and the display area 7021 of the game field 702 is generated by the use of the game field data in step S1020 to step S1022 of FIG. 8. Thus, the player can confirm an influence given by the customization to the image on the game field 702 prior to customizing the display mode of the game field 702.

In addition, in the above-described embodiment, description has been made for an example of the case where the items 704a and 704b to be selected are displayed on the selection field 704, as shown in FIG. 10. However, the selection field 704 may be the one where the items to be selected are displayed in a so-called pull-down menu style.

Further in the above-described embodiment, description has been made for the case where the display mode of the object field is changed such that the object field can be formed into an image as if the object field is tilted with a vertical line of the display screen as an axis. Here, the tilt is formed by changing the ratio of the lengths of the right/left sides and the magnification of the lengths of the upper/lower sides of the object field, based on the perspective value registered with the current 804b of the management TB 804, or based on the foregoing perspective value and the perspective value determined according to the manipulation contents of the analog manipulation portions 31 and 32 of the controller 20. However, the present invention is not limited to this.

For example, the display mode of the object field may be changed such that the object field can be formed into an image as if the object field is tilted with a horizontal line of the display screen as an axis. Here, the tilt is formed by changing the ratio of the lengths of the upper/lower sides and the magnification of the lengths of the right/left sides of the object field, based on the perspective value registered with the current 804b of the management TB 804, or based on the foregoing perspective value and the perspective value determined according to the manipulation contents of the analog manipulation portions 31 and 32 of the controller 20.

Alternatively, instead of the perspective value, a deformation ratio of another geometric deformation may be previously registered with the management TB 804, and thus the geometric deformation may be applied to the object field based on the deformation ratio registered with the current 804b of the management TB 804, or based on the foregoing deformation ratio and the deformation ratio determined according to the manipulation contents of the analog manipulation portions 31 and 32 of the controller 20. The display mode of the object field may be thereby changed.

Furthermore, in the above-described embodiment, the field data where the display mode thereof can be customized during the game mode is limited to the game field data. However, the present invention is not limited to this. For example, during the game mode, an object to be customized may be selected by the analog manipulation portions 31 and 32 of the controller 20, so that the display mode of the selected field data can be customized.

Furthermore, in the above-described embodiment, description has been made for the controller 20, in which the analog manipulation portions 31 and 32 thereof are assigned to manipulation for changing each display mode of the game field, the caption field and the selection field, while the other buttons are assigned to manipulation for other various kinds of settings and execution of the game. However, the present invention is not limited to this.

In addition, in the above-described embodiment, description has been made by exemplifying the game program such as an RPG, an AVG and an SLG as the application PG 501 to be executed by the entertainment apparatus 1. However, the display control PG 502 of the present invention can be widely applied to applications that generate a plurality of field data and output them onto the display device.

Furthermore, the exterior appearance and the hardware structure of the entertainment apparatus of the present invention are not limited to the ones shown in FIGS. 1 to 3. The entertainment apparatus of the present invention may be, for example, the one with a structure of a general computer including such as: a CPU; a memory; an external storage device such as a hard disk device; a reading device for reading data from a storage medium having portability such as a CD-ROM and a DVD-ROM; an input device such as a keyboard and a mouse; a display device such as a display; a data communication device for performing communication via a network such as the Internet; and an interface for controlling data transmission/reception among the above-described devices.

Furthermore, the program and the various data for building the software structure shown in FIG. 5 on the entertainment apparatus may be read from the storage medium having portability via the reading device and may be stored in the memory or the external storage device. Alternatively, they may be down loaded from the network via the data communication device and may be stored in the memory or the external storage device.

Furthermore, in the above-described embodiment, description has been made for the case where the Z coordinate value on the screen coordinate system of each field data (the game field, the caption field and the selection field) on the 3D effect display is previously set. However, the Z coordinate value may be arbitrarily set by the user with the use of the controller. For example, when the item 708b of the 3D effect display is selected on the display setting field shown in FIG. 18, the Z coordinate value on the screen coordinate system of the above each field data may be sent from the user via the controller.

As described above, according to the present invention, the manipulator can immediately customize displaying of the display data onto the display device when needed, the display data being generated by an application program, particularly a game program, which is running on a computer such as the entertainment apparatus.

What is claimed is:

1. A storage medium storing a display control program for controlling displaying of display data passed from an application program running on a computer, wherein said display control program is read and executed by said computer to build the following means on said computer:

first means for receiving an assignment of a deformation ratio of an image represented by said display data from a manipulator via a manipulation device; and second means for processing said display data in accordance with the deformation ratio assigned by said first means and for displaying the display data onto a display screen of said display device;

wherein said first means receives an assignment of the deformation ratio relating to a ratio of the lengths of right/left sides of the image represented by said display data and a magnification of the lengths of upper/lower sides of the image, or relating to a ratio of the lengths of the upper/lower sides of the image and a magnification of the lengths of the right/left sides of the image, as the assignment of the deformation ratio of the image represented by said display data, and said second means treats said display data as texture data, deforms the ratio of the lengths of right/left sides of the image represented by the display data and the magnification of the lengths of upper/lower sides of the image, or deforms the ratio of the lengths of the upper/lower sides of the image and the magnification of the lengths of the right/left sides of the image, in accordance with the deformation ratio assigned by said first means, and displays the display data onto the display screen of said display device.

2. The storage medium storing the display control program according to claim 1, wherein said second means processes said display data in accordance with the deformation ratio assigned by said first means and displays the display data onto the display screen of said display device only when said first means is receiving the assignment of the deformation from the manipulator.

3. The storage medium storing the display control program according to claim 1, wherein said application program is a game program and includes game field data for displaying a game image as display data generated by the program, said first means receives the assignment of the deformation ratio of the game image represented by said game field data, and said second means processes said game field data in accordance with the deformation ratio assigned by said first means and displays the display data onto the display screen of said display device.

4. The storage medium storing the display control program according to claim 1, wherein said storage medium stores said application program as well.

5. An entertainment apparatus for displaying display data onto a display device, comprising:

assignment receiving means for receiving an assignment of a deformation ratio of an image represented by said display data from a manipulator via a manipulation device; and display control means for processing said display data in accordance with the deformation ratio assigned by said assignment receiving means and for displaying the display data onto a display screen of the display device;

wherein said entertainment apparatus changes a game image to be displayed on said display device in accordance with selection contents by the manipulator received via said manipulation device, said assignment receiving means receives an assignment of a deformation ratio relating to a ratio of the lengths of right/left sides of said game image and a magnification of the lengths of upper/lower sides of the game image, or relating to a ratio of the lengths of the upper/lower sides of the game image and a magnification of the lengths of the right/left sides of the game image, as the assignment of the deformation ratio of the image represented by said display data, and said display control means treats said display data as texture data, deforms the ratio of the lengths of right/left sides of said game image and the magnification of the lengths of upper/lower sides of said game image, or deforms the ratio of the lengths of the upper/lower sides of said game image and the magnification of the lengths of the right/left sides of said game image, in accordance with the deformation ratio assigned by said assignment receiving means, and displays the display data onto the display screen of said display device.

6. A display control program for controlling displaying of display data passed from an application program running on a computer, wherein said display control program is stored in a storage device, and is read and executed by the computer to build the following means on said computer:

first means for receiving an assignment of a deformation ratio of an image represented by said display data from a manipulator via a manipulation device; and second means for processing said display data in accordance with the deformation ratio assigned by said first means and for displaying the display data onto a display screen of said display device;

wherein said first means receives the assignment of a deformation ratio relating to a ratio of the lengths of right/left sides of the image represented by said display data and a magnification of the lengths of upper/lower sides of the image, or relating to a ratio of the lengths of the upper/lower sides of the image and a magnification of the lengths of the right/left sides of the image, as the assignment of the deformation ratio of the image represented by said display data, and said second means treats said display data as texture data, deforms the ratio of the lengths of right/left sides of the image represented by said display data and the magnification of the lengths of upper/lower sides of the image, or deforms the ratio of the lengths of the upper/lower sides of the image and the magnification of the lengths of the right/left sides of the image, in accordance with the deformation ratio assigned by said first means, and displays the display data onto the display screen of said display device.

7. The display control program according to claim 6, wherein said second means processes said display data in accordance with the deformation ratio assigned by said first means and displays the display data onto the display screen of said display device only when said first means is receiving the assignment of the deformation from the manipulator.

8. The display control program according to claim 6, wherein said application program is a game program and includes game field data for displaying a game image as display data generated by the program, said first means receives the assignment of the deformation ratio of the game image represented by said game field data, and said second means processes said game field data in accordance with the deformation ratio assigned by said first means and displays the display data onto the display screen of said display device.

* * * * *